United States Patent Office 3,290,499
Patented Dec. 6, 1966

3,290,499
FILM FOR INDICATING DOSAGE OF
IONIZING RADIATION
Raymond Lester Vale, Abingdon, and John Joseph Farrell, Blewbury, England, assignors to United Kingdom Atomic Energy Authority, London, England
No Drawing. Filed Oct. 31, 1961, Ser. No. 148,807
Claims priority, application Great Britain, Nov. 2, 1960, 37,652/60; Aug. 14, 1961, 29,240/61
18 Claims. (Cl. 250—83)

This invention relates to radiation indicators and is particularly concerned with radiation indicators comprisng an acid-sensitive dye or dyes in contact with halogen-containing material.

When halogen-containing polymer compositions such as vinyl chloride or vinylidene chloride polymers or copolymers, or mixtures of halogen-free polymers with comparatively low molecular weight, but non-volatile, halogen-containing substances such as chlorinated paraffins, are exposed to ionizing radiation (e.g. high energy electrons, or gamma rays), the hydrogen halo-acid (e.g. hydrochloric acid) is liberated and affects the color of particular acid-sensitive dyes with which it comes in contact.

According to the present invention, a radiation indicator comprises a film deposited from an aqueous emulsion of a halogen-containing polymer composition, the aqueous phase of the emulsion having incorporated therein an acid-sensitive dye which gives a color change when the film is exposed to ionizing radiation. The dye may be a water-soluble dye dissolved in the aqueous phase, or an oil-soluble dye emulsified in the aqueous phase.

Films deposited from such emulsions e.g. by painting or printing onto a suitable surface, provide a very convenient form of indicator. For example, the emulsion may be deposited directly onto a package for irradiation, by printing or painting onto such a package, or may be used for coating an adhesive or non-adhesive label, tape, paper, or plastic film, for application to such a package.

Radiation indicators comprising films deposited from aqueous emulsion also have the advantage that the color changes induced in them by irradiation are considerably more stable than the corresponding color changes in films deposited from solutions of the halogen-containing polymer compositions. Such stability may possibly be connected with the residual water content of the deposited film and with the chemical state of the hydrogen halo-acid liberated in the film on irradiation, or it may be connected with the physical form of the deposited film.

Suitable polymer compositions for use in the form of aqueous emulsions in the invention are polymers and copolymers of vinyl and vinylidene chlorides. Internally plasticized polymer compositions, e.g. those containing an acrylic ester as a component of the polymer, are particularly suitable since more homogeneous and less permeable films are deposited therefrom.

Films may be deposited by any of the usual methods, e.g. by roller coating, brush coating, spraying, stencilling or printing. A particularly suitable method is to apply the emulsion by roller coating to the surface of a continuous strip (of paper or other backing material) having adhesive labels temporarily attached thereto, e.g. by using a roller dipping into a trough containing the emulsion. A surface scraper is preferably used to remove excess emulsion and a uniform film of emulsion remains which on drying gives a film thickness of about 0.0004 inch.

Suitable dyes for incorporation in the film comprised by the radiation indicator are the following:

Dimethyl Yellow (p-dimethylamino-azobenzene)
Diethyl Yellow (p-diethylamino-azobenzene)
Phenyl 2-azo-1-naphthylamine
Meta Methyl Red (p-dimethylamino-azobenzene-m-carboxylic acid)
Congo Red (p,p'-biphenylene biz-2-azo-naphthylamine-4-sulphonic-acid)
Thymol Blue, Xylene Cyanol FF (sulphonated triphenylmethane derivatives)

Combinations of these dyes may be used also. The color changes of these dyes on irradiation are easily recognizable. The color change after 2.5M rad of gamma radiation is given in the following table, the dye being present in a film deposited from an aqueous emulsion, in accordance with the invention:

| Dye: | Color change |
|---|---|
| Dimethyl Yellow | Yellow to red. |
| Diethyl Yellow | Yellow to red. |
| Phenyl 2-azo-1-naphthylamine | Yellow to purple. |
| Meta Methyl Red | Yellow to red. |
| Congo Red | Red to blue. |
| Thymol Blue | Yellow to red. |
| Xylene Cyanol FF | Blue to green. |

Thymol Blue is a water soluble dye and can be dissolved directly in the aqueous phase of the emulsion. The other dyes listed above are oil-soluble dyes and are preferably emulsified in water, with the aid of a suitable surface-active agent if necessary, before addition to the emulsion. The preferred dyes are Dimethyl Yellow and Diethyl Yellow, which give strong color changes and are the most stable to heat and light after the color change.

The radiation indicators of the present invention before irradiation are stable towards hydrochloric acid vapor and dilute aqueous solutions of hydrochloric acid, and are also unaffected by heating for long periods at 80° C. or for one hour at 120° C. They are, however, sensitive to light in both the ultra-violet and visible regions, which also causes liberation of acid from the polymer and a consequent color change to occur, and it is preferred to protect them from the effects of light.

Protection against ultra-violet light is afforded by the incorporation of ultra-violet absorbers, such as benzophonone derivatives, either in the film itself or in a coating over the film. Protection against ultra-violet light is also afforded by coating the film with a layer of common rosin or colophony.

Protection against visible light is afforded by incorporating a dye in a coating over the film such dye having absorption characteristics in the visible region similar to those of the dye in the indicator film itself. The dye in the coating may indeed be the same as that in the indicator film provided that the coating does not contain a halogen-containing substance. Alternatively, the dye in the coating may be one which does not change color on exposure to ionizing radiation, even when in contact with halogen-containing material.

Protection against both ultra-violet and visible light, such as is present in bright sunlight, may conveniently be afforded by the use of a coating of common rosin containing a suitable dye, over the film. An ultra-violet absorber may optionally be included in the film or in the coating or in both the film and the coating. In all cases, of course, the protective layer is transparent such that the color of the first layer can be observed.

The sensitivity of the radiation indicator film may be reduced, i.e. the radiation dose at which the color change occurs may be increased, by the addition of compounds to the emulsion which absorb some of the hydrogen haloacid liberated or irradiation, and therefore delay the color change, e.g. organic water-soluble bases such as triethanolamine. The addition of such bases may also be used to co-operate with the material onto which the film is deposited, in influencing the sensitivity of the film. Thus a lesser quantity of base would be added, if the film is to be deposited on a label having an alkaline reaction, than if it is to be deposited on a label having a neutral or acidic reaction. It is also believed that triethanolamine influences the course of the reaction which liberates hydrogen haloacid in the film by, in some measure, functioning as a scavenger of free radicals.

The dye in the radiation indicator film may be present in a concentration of from 0.4% to 6% of the dry weight of the film, the preferred concentration being from 2% to 3%. The surface-active agent used in emulsifying the dye in water, if necessary, should be one which does not adversely affect the colloidal properties of the emulsion. Anionic or nonionic detergents could be used.

The following are examples of the preparation of radiation indicators according to the invention.

*Example I*

An emulsion for deposition of a radiation indicator film was made up as follows, the quantities being given in g./100 ml. of emulsion:

Dimethyl Yellow _____ 1.2
Cyasorb UV24 _____ 2.0
Triethanolamine _____ 0.1
Geon 652 _____ Remainder "Geon 652" is a neutral (pH7) aqueous dispersion of an internally-plasticized copolymer of vinyl chloride, vinylidene chloride and an acrylic ester, the dispersion containing about 51% solids by weight. "Cyasorb UV24" is an ultra-violet absorber consisting essentially of 2,2'-dihydroxy-4-methoxy-benzophenone. Triethanolamine was included to absorb some of the free hydrochloric acid liberated on irradiation and thus reduce the sensitivity of the indicator film. The dye, Dimethyl Yellow, was first ground with a small amount of an anionic detergent, of the secondary alkyl sulphonate type, before incorporating it in the emulsion. A rectangular brass trough was partially filled with about 40 ml. of the emulsion. A nylon roller 1½ inches in diameter and 1½ inches wide was arranged to dip into the emulsion in the trough, and a continuous tape 9/16 inch wide and carrying 5000 ½ inch diameter labels at 9/16 inch intervals (between centres) was drawn off a 2-inch diameter reel and over the roller at the rate of 300 labels per minute. The tension and drive for the tape was provided by a 6 r.p.m. synchronous motor turning an 8-inch diameter spool onto which the tape was wound. The tape was passed over a surface scraper immediately after leaving the roller to remove excess emulsion and then dried, by passing over an infrared lamp, to give a radiation indicator film 0.0004 inch thick and containing approx. 2.4% by weight of dye on each label. It was found that 100 labels could be coated by this apparatus per ml. of emulsion. The tape with the radiation indicator film thereon was then run off onto a 2-inch diameter reel and transferred to similar apparatus in which the tape was coated with a protective layer by a similar procedure, but using a coating solution having the following composition in place of the emulsion, the quantities being given in g./100 ml. of solution:

Common rosin _____ 40
Alcovar Yellow 3G _____ 6
Methanol _____ Remainder

The tape was drawn off the spool and over the roller dipping into the rosin solution at the rate of 150 labels per minute, and then dried by passing through a furnace at 160° C. to give a coating 0.0004 inch thick and containing approx. 15% by weight of light-absorbing dye, on each label.

Radiation indicator labels prepared as in Example I had a satisfactory stability on exposure to bright sunlight. On irradiation by a cobalt–60 gamma ray source delivering a dose of 0.25M rad/hour, a total dose of 2.5M rad produced a color change in the labels from yellow to red. The red color did not fade during a period of several months thereafter. On irradiation by electrons of 4 mev. energy from an electron linear accelerator delivering a dose of 1M rad/minute, a similar total dose produced a slightly different shade of red, which was fully developed a few minutes after irradiation had ceased, and which then showed a similar stability.

*Example II*

Radiation indicator labels were prepared as in Example I, except that the emulsion was made up using neutralized "Texicryl DP/901VC," which is an acidic (pH4) aqueous dispersion of an internally plasticized copolymer of vinylidene chloride and an acrlyic ester, containing about 50% solids by weight, instead of "Geon 652."

Labels prepared as in Example II were very similar in behavior to those of Example I.

*Example III*

Radiation indicator labels were prepared as in Example I, except that the emulsion was made up using "Geon 151," which is an aqueous dispersion of polyvinyl chloride containing about 53% solids by weight, instead of "Geon 652."

The color change produced in labels prepared as in Example III, namely yellow to orange-red, was not quite so strong as that produced in labels prepared as in Examples I and II, and this is thought to be due to the use of an unplasticized polymer in the emulsion, which does not lead to the formation of such a homogeneous or impermeable layer as does the use of an internally plasticized polymer. Indeed the radiation indicator film based on unplasticized polyvinyl chloride, before being coated with the rosin-containing protective layer, was brittle and powdery, and showed only a slight color change on irradiation. This is believed to be due to the action of water vapor in the atmosphere. The radiation indicator films based on the internally plasticized polymers used in Examples I and II were strong and homogeneous, and showed strong color changes on irradiation even before being coated with the protective layer.

Radiation indicator labels could be prepared as in Example I using the dyes other than Dimethyl Yellow (which have been mentioned previously) in the radiation indicator film, and suitable light-absorbing dyes in the rosin-containing protective layer.

We claim:

1. A radiation indicator for ionizing radiation comprising a support and first and second layers thereon, said first layer comprising a dried aqueous emulsion of a halogen-containing polymer composition containing an acid-sensitive dye which dye gives a color change on reaction with a halogen acid liberated from said halogen-containing polymer upon exposure thereof to ionizing radiation, said second layer being on the side of said first layer which is remote from the support and comprising a transparent protective layer including materials which protect said first layer from the effects of ultra-violet and visible light.

2. A radiaton indicator according to claim 1 wherein the dried aqueous emulsion contains a residual water content and wherein the first layer contains an ultra-violet absorber.

3. A radiation indicator according to claim 1 wherein the protective layer includes a dye which is the same as the dye in the first layer and wherein the protective layer is free of materials which liberate halogen acid by ionizing radiation.

4. A radiation indicator according to claim 1 wherein the halogen-containing polymer composition is selected from the group consisting of vinyl chloride, vinylidene chloride and copolymers of vinyl chloride and vinylidene chloride.

5. A radiation indicator according to claim 4 wherein the halogen-containing polymer composition is an internally plasticized copolymer.

6. A radiation indicator according to claim 1 wherein the polymer composition comprises a copolymer of vinyl chloride, vinylidene chloride and an acrylic ester.

7. A radiation indicator according to claim 1 wherein the dye is selected from the group consisting of p-dimethylamino-azobenzene and p-diethylamino-azobenzene.

8. A radiation indicator according to claim 1 wherein the first layer contains a water soluble organic basic material to absorb acid liberated from the polymer composition by radiation.

9. A radiation indicator according to claim 1 wherein the protective layer comprises a dye having absorption characteristics in the visible region of the spectrum.

10. A radiation indicator according to claim 1 wherein the protective layer comprises rosin.

11. A radiation indicator for ionizing radiation in the form of a film comprised by a first layer comprising a halogen-containing polymer composition and acid-sensitive dye which gives a color change on reaction with a halogen acid liberated from said halogen-containing polymer by ionizing radiation, wherein said first layer comprises dried aqueous emulsion of the said polymer, said emulsion containing the said dye, and said first layer having deposited thereon a coating comprising common rosin containing the same acid-sesitive dye as in the first layer, the said coating containing no halogen-containing substance.

12. A radiation indicator according to claim 11 wherein the halogen-containing polymer composition is selected from the group consisting of vinyl chloride, vinylidene chloride, and copolymers of vinyl chloride and vinylidene chloride.

13. A radiation indicator according to claim 12 wherein the polymer composition is an internally plasticized copolymer.

14. A radiation indicator according to claim 11 wherein the polymer composition comprises a copolymer of vinyl chloride, vinylidene chloride and an acrylic ester.

15. A radiation indicator according to claim 11 wherein the acid-sensitive dye is selected from the group consisting of p-dimethylamino-azobenzene and p-diethylamino-azobenzene.

16. A radiation indicator according to claim 11 including an ultra-violet absorber in said first layer.

17. A radiation indicator according to claim 11 wherein the first layer contains a water soluble organic basic material to absorb acid liberated from the polymer composition by radiation.

18. A radiation indicator according to claim 17 wherein the water soluble organic base material is triethanolamine.

References Cited by the Examiner

UNITED STATES PATENTS

| | | | |
|---|---|---|---|
| 2,431,745 | 12/1947 | Flanaghan | 117—161 |
| 2,700,736 | 1/1955 | Roberts | 250—83 |
| 2,738,429 | 3/1956 | Goldblith | 250—83 |
| 2,848,625 | 8/1958 | Taplin | 250—83 |
| 2,858,447 | 10/1958 | Taplin | 250—83 |
| 2,874,299 | 2/1959 | Barkas | 250—83 |
| 3,031,575 | 4/1962 | Gevontman | 250—83 |
| 3,110,618 | 11/1963 | Resnick | 117—161 |
| 3,131,080 | 4/1964 | Russell | 250—65 |

OTHER REFERENCES

Fast Neutron, Insensitive Chemical Gamma-Ray Dosimeter, by Sigoloff, Nucleonics, vol 14, No. 10, October 1956, pp. 54 to 56.

Gamma Ray Dosimeter With Polyvinyl-Chloride Films, by Henley et al., Nucleonics, vol. 9, No. 6, December 1951, pp. 62 to 66.

WALTER STOLWEIN, *Primary Examiner.*

RALPH G. NILSON, JAMES W. LAWRENCE,
*Examiners.*